United States Patent

Tolkacz et al.

[11] Patent Number: 5,855,533
[45] Date of Patent: Jan. 5, 1999

[54] AUTOMOTIVE POWERTRAIN CONTROL

[75] Inventors: Joseph Mark Tolkacz, Novi; Eric Hans Gassenfeit, Grosse Pointe Park, both of Mich.

[73] Assignee: General Motors Corporation, Detroit, Mich.

[21] Appl. No.: 762,792

[22] Filed: Dec. 9, 1996

[51] Int. Cl.⁶ .................................................. B60K 41/04
[52] U.S. Cl. ......................... 477/110; 477/120; 477/904
[58] Field of Search .............................. 477/97, 98, 107, 477/110, 111, 120, 904, 101

[56] References Cited

U.S. PATENT DOCUMENTS

| | | | |
|---|---|---|---|
| 4,685,548 | 8/1987 | Holtermann et al. | 477/85 X |
| 4,938,100 | 7/1990 | Yoshimura et al. | 477/101 |
| 4,943,920 | 7/1990 | Hiramatsu et al. | 477/154 X |
| 4,947,330 | 8/1990 | Hiramatsu | 477/121 X |
| 4,947,734 | 8/1990 | Fujita et al. | 477/98 X |
| 5,072,630 | 12/1991 | Kikuchi et al. | 477/101 X |
| 5,385,511 | 1/1995 | Iizuka | 477/117 X |
| 5,470,290 | 11/1995 | Minowa et al. | 477/904 X |
| 5,514,047 | 5/1996 | Tibbles et al. | 477/46 |
| 5,681,238 | 10/1997 | Minowa et al. | 477/107 X |

*Primary Examiner*—Dirk Wright
*Assistant Examiner*—Peter T. Kwon
*Attorney, Agent, or Firm*—Michael J. Bridges

[57] ABSTRACT

Engine speed control during garage shift maneuvers of a transmission coupled, via a transmission input shaft, to a driven turbine of a hydrodynamic converter, the driven turbine fluidically coupled to a driving pump of the converter, the pump coupled to an engine output shaft, wherein engine output torque is controlled in response to a deviation in turbine acceleration away from a target turbine acceleration, to minimize rate of change in turbine acceleration (jerk) during the garage shift maneuver, so as to reject engine torque load changes that may result in undesirable engine speed variation.

12 Claims, 3 Drawing Sheets

AUTOMOTIVE POWERTRAIN CONTROL

TECHNICAL FIELD

This invention relates to powertrain controls and, more particularly, to control of powertrain acceleration while loading or unloading a transmission.

BACKGROUND OF THE INVENTION

In automotive powertrain control, a transition between a driven and an undriven transmission gear, such as between drive or reverse and park or neutral, is commonly referred to as a garage shift maneuver. An undesirable engine speed change often occurs during a garage shift maneuver due to application of or removal of the substantial torque load of the driven vehicle wheels from the engine. The speed change may simply be an annoyance to the powertrain operator or may significantly affect engine performance. The step change in torque load during a garage shift maneuver provides a significant control challenge for conventional powertrain control systems which attempt to reject the change in torque load to maintain a substantially constant engine speed throughout a garage shift maneuver.

Engine speed control during a garage shift maneuver has been proposed. The proposed control varies engine speed during a garage shift maneuver in response to sensed change in engine speed and in engine intake manifold absolute air pressure (MAP). When a significant change in engine speed is accompanied by a significant MAP change under such proposed control, engine fueling rate, intake air rate or ignition timing is adjusted as a function of the engine speed change and perhaps further as a function of the MAP change to vary engine output torque in direction to minimize such change. The difficulty with this approach is that it is reactive. A significant and officious engine speed deviation away from a desired speed may be required before any action is taken to reduce such speed change. An unpleasant engine speed deviation away from a target engine speed may be unavoidable during garage shift maneuvers under such proposed control. Powertrain stability and powertrain operator confidence may suffer under this reactive approach.

It has further been proposed to control engine speed during a garage shift maneuver by controlling the hydraulic pressure applied across transmission shift control lines to vary the time of transmission gear shift. Line pressure is proposed to be increased or decreased as a function of an estimated prior garage shift timing error. Such proposed control requires engine speed to be stable and within a prescribed speed range at the onset of the garage shift maneuver. If such conditions are not met, as is frequently the case during a garage shift maneuver, an undesirable engine speed deviation away from a target engine speed may occur during the garage shift maneuver.

A hydrodynamic converter (hereinafter a torque converter) is generally known to be applied as a coupling between an engine and a transmission, providing well-established torque multiplication and hydrodynamic damping benefits. The torque converter includes a pump which rotates with an engine output shaft and a turbine which rotates with a transmission input shaft. The pump drives transmission fluid in the torque converter assembly which drives the turbine. In torque multiplication mode, a positive slip (rotational speed difference) is present between the pump and the turbine providing for a torque multiplication across the torque converter. In high efficiency mode, virtually no slip is present between the pump and the turbine, providing for a hydrodynamic clutch function. During a garage shift maneuver, the rate of rotation of the turbine (turbine speed) changes rapidly due to a step change in transmission torque load. The load is passed across the torque converter from the turbine to the pump and is then applied as an engine output torque load change which can, under the prior art control, perturb engine speed substantially away from a target engine speed.

Figure 1A:
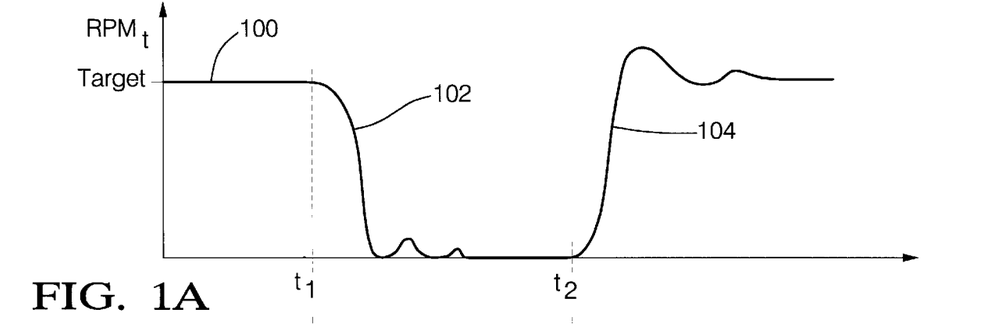
FIGS. 1A and 1B are parameter diagrams illustrating transient speed response under garage shift maneuvers.
Figure 1B:
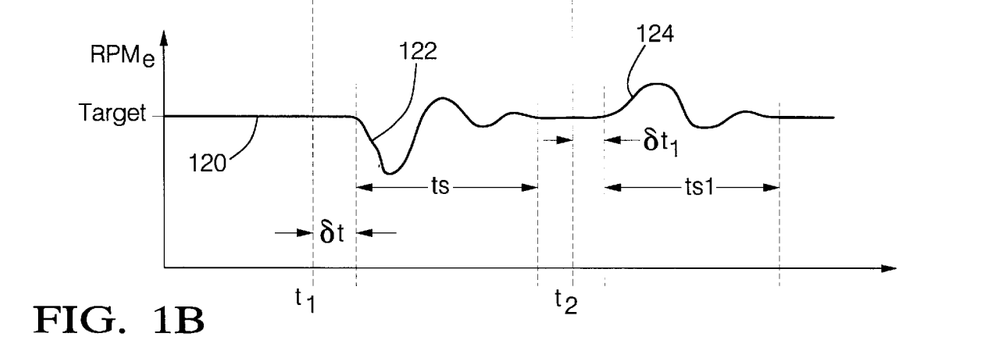

FIG. 1A illustrates turbine speed change under two representative garage shift maneuvers. FIG. 1B illustrates a corresponding (undesirable) engine speed change for the same two garage shift maneuvers. Curve 100 represents turbine speed for a powertrain in a neutral or park transmission gear with substantially no load applied across the torque converter such that engine speed (curve 120 of FIG. 1B) and turbine speed are substantially at a target rate of rotation. At time t1, a garage shift maneuver is initiated in which the transmission is shifted from the neutral or park gear into a driven gear (either a drive gear or a reverse gear). The application of a transmission load immediately causes a significant decrease in turbine speed toward zero as illustrated by curve 102 of FIG. 1A, while engine speed initially remains substantially constant and remains largely unaffected throughout a period of time δt during which the change in load is transferred across the torque converter to the engine output shaft. Following time δt, the load change is reflected to the engine output shaft and engine speed begins a sharp decrease as illustrated by curve 122. Prior art engine speed control procedures may reactively compensate the engine speed drop well after the time delay δt and drive engine speed back toward the target engine speed. Engine speed control may later stabilize following a settling time ts.

At time t2, a second garage shift maneuver is initiated in which the transmission is shifted from a drive gear (drive or reverse) into park or neutral which corresponds to a step removal of a torque load. The torque load removal immediately causes a significant increase in turbine speed from zero (or any initial speed) toward a final speed along curve 104 (FIG. 1A), while engine speed initially remains constant. Following a period of time δt1 after time t2 during which the change in load is transferred across the torque converter to the engine output shaft, engine speed begins a speed increase as illustrated by curve 124. Prior art engine speed control procedures may reactively compensate the engine speed increase a period of time after time δt1 and drive engine speed back toward the target engine speed. Engine speed control may later stabilize following a settling time ts1. FIGS. 1A and 1B illustrate the significant delay between the start of the garage shift maneuver and the time a reactive compensator, such as the described prior art compensator, responds, to stabilize engine speed control.

It would be desirable to anticipate engine speed change during a garage shift maneuver and, under all engine operating conditions, proactively compensate the anticipated change so that engine speed may remain stable throughout a garage shift maneuver.

SUMMARY OF THE INVENTION

The present invention is directed to internal combustion engine speed control responsive to torque converter turbine speed deviation during garage shift maneuvers under a wide variety of powertrain operating conditions.

More specifically, when a request for a garage shift maneuver is detected, a turbine speed monitoring procedure is initiated over the garage shift maneuver to determine turbine acceleration. A target turbine acceleration is identified as consistent with a desired garage shift maneuver. Time rate of change in turbine acceleration, termed turbine "jerk" leads to significant engine torque load change which can significantly perturb engine speed away from a target engine speed. The degree of such jerk, for example as indicated by a deviation in turbine acceleration away from a target turbine acceleration, is determined. Engine output torque control is responsive to such deviation to minimize its impact on engine speed stability.

In accord with a further aspect of this invention, engine output torque control operations include operations to vary engine output torque in response to any turbine jerk to add or remove a required amount of engine output torque to oppose the torque load change caused by the garage shift maneuver. In accord with a further aspect of this invention, a target turbine speed change is determined as a function of the operating conditions that are present during a garage shift maneuver. Actual change in turbine speed is determined and turbine acceleration error is calculated as a difference between the target turbine speed change and the actual turbine speed change. Engine output torque change is then determined as a function of the error.

In accord with yet a further aspect of this invention, transmission fluid temperature is measured and the target turbine speed change and the timing of the controlled change in engine output torque is determined as a function of the measured temperature. In accord with yet a further aspect of this invention, at least one of the group of parameters controlled through engine intake air rate control, engine fueling rate control, and engine ignition timing control is varied to provide the engine output torque change to oppose the torque load change.

BRIEF DESCRIPTION OF THE DRAWING

The invention may be best understood by reference to the preferred embodiment and to the drawings in which.

DESCRIPTION OF THE PREFERRED EMBODIMENT

Figure 2:
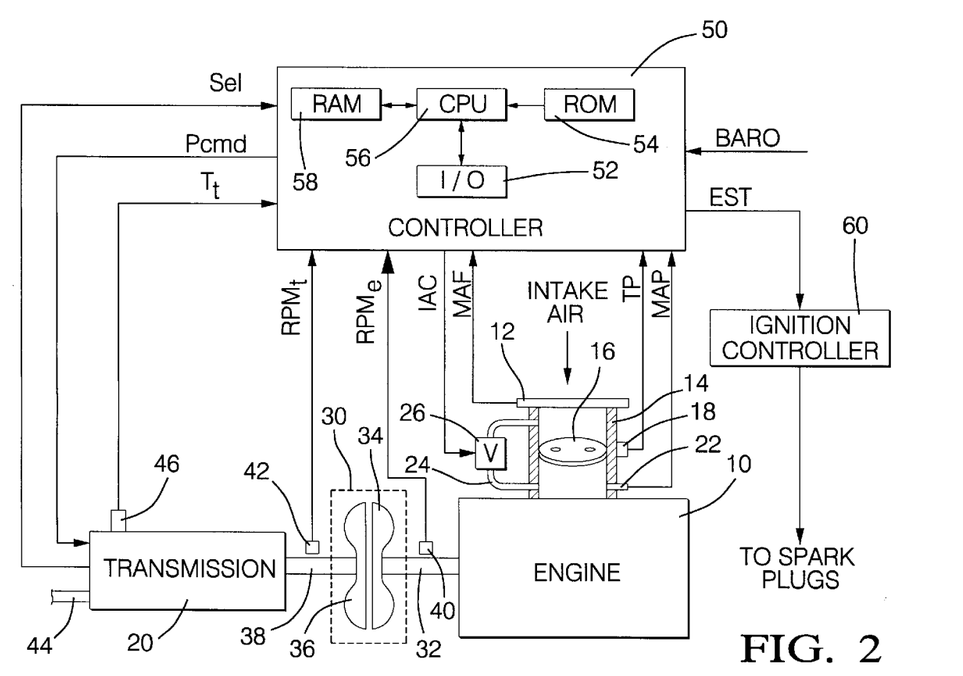
FIG. 2 is a general diagram of a powertrain and powertrain control hardware for carrying out this invention in accordance with the preferred embodiment.

Referring to FIG. 2, internal combustion engine 10 receives intake air through intake air bore 14 past mass airflow meter 12 of the hot wire or thick film type which transduces mass flow rate of air into the bore into output signal MAF. Restriction of intake air passing through the intake bore 14 is controlled through conventional manual or electronic positioning of intake air valve 16 of the rotary or butterfly valve type. The position of the valve 16 within the intake bore 14, such as the rotational position of a butterfly valve, is transduced by position transducer 18 of the potentiometric type which includes a wiper which rotates along a resistive track with the intake air valve 16, wherein the electrical resistance between the wiper and an end of the track is output as signal TP indicating valve displacement away from an initial position.

Bypass conduit 24 opens, on a first conduit end, into the intake bore on a first side of the intake air valve 16 and opens on a second conduit end opposing the first conduit end on a second side of the intake air valve opposing the first side of the intake air valve 16. The bypass conduit 24 provides a controlled bypass passage around the intake air valve 16. The restriction of the bypass conduit 24 to air passage therethrough is controlled by electronically controlled bypass valve V 26 of the conventional solenoid or stepper motor actuated type, responsive to valve control command IAC.

Intake air pressure downstream of the intake air valve 16 in an engine intake manifold (not shown) is transduced by conventional pressure transducer 22 into output signal MAP. Intake air is distributed by the intake manifold to engine cylinder intake runners (not shown). The distributed intake air is mixed with an injected fuel quantity and delivered for combustion to engine cylinders (not shown). Cylinder combustion events reciprocally drive conventional pistons (not shown) within the cylinders, each piston connected via a connecting rod (not shown) to an engine output shaft 32, such as a crankshaft. The rate of rotation of the engine output shaft 32 (termed engine speed) is transduced by speed sensor 40 of the variable reluctance or Hall effect type into output signal RPMe.

The sensor 40 is fixed in position relative to the rotating output shaft 32 in proximity to spaced teeth or notches (not shown) about a section of the shaft 32. Passage of the teeth or notches through a sensor magnetic field generate a periodic sensor output signal RPMe with a signal frequency proportional to the rate of rotation of the output shaft 32. Angular displacement of the engine through an engine cycle may be determined using individual cycles of the signal RPMe, for example with each cycle indicating occurrence of a cylinder event within an engine cycle.

Engine output torque is translated to conventional automatic transmission 20 through hydrodynamic converter 30 (torque converter) of any suitable conventional type, including a pump element 34 fixedly attached to and rotating with engine output shaft 32 and a turbine 36 fixedly attached to and rotating with transmission input shaft 38. The pump drives transmission fluid (not shown) within the torque converter 30 to drive the turbine 36 for power translation through to the transmission 20. Transmission provides for transfer of engine output torque at a controlled gear ratio corresponding to a current transmission state from transmission input shaft 38 to transmission output shaft 44 for application to driven vehicle wheels. The current transmission state is electronically selected by pressure state signal Pcmd and is indicated via the state of transmission output signal Sel.

In a park or neutral transmission state, the transmission input shaft 38 rotates freely without any significant torque load applied thereto from the transmission 20. In a drive transmission state, which may include any forward drive gear or the reverse gear of the typical conventional transmission 20, the substantial torque load of the transmission and the driven vehicle wheels is applied to the transmission input shaft 38. Such torque load is translated across the torque converter 30 as a torque load on the engine output shaft 32.

A garage shift maneuver is defined as a shift between the park or neutral transmission state and a drive transmission state and is characterized by a significant time rate of change in the torque load applied to the engine output shaft 32 from the transmission input shaft 38 and across the torque converter 30. The significant time rate of change in torque load is proactively compensated in accord with the principles of this invention through engine output torque control responsive to change in turbine speed. A turbine speed sensor 42 transduces rate of rotation of the turbine 36 into output signal RPMt. For example, the sensor 42 may be of the variable reluctance or Hall effect type, such as in the form of a permanent magnet surrounded by a coil of wire that is mounted to a transmission case (not shown). The sensor is fixed in position relative to the rotating turbine 36 or to the transmission input shaft 38 which rotates with the turbine. A plurality of spaced teeth or notches are provided about a section of the turbine 36 or the input shaft 38 to pass by the sensor 42, wherein the frequency of the sensor output signal RPMt is proportional to the rate of rotation of the turbine 36 and is applied as an input signal to the engine output torque control operations of this embodiment.

Transmission fluid is circulated throughout the transmission 20 via a conventional transmission fluid circulation path (not shown). A temperature sensor 46 in the form of a thermistor or thermocouple is provided in position to be exposed to the circulating transmission fluid (such as oil) to transduce the fluid temperature into output signal Tt. A barometric pressure sensor of any suitable conventional type is provided for transducing ambient barometric pressure into output signal BARO. Alternatively, pressure sensor 22 may be sampled under appropriate conditions as an indication of barometric pressure, wherein said appropriate conditions are conditions under which there is substantially no pressure drop across the intake air valve 16, such as zero airflow conditions or fully open intake air valve conditions.

Controller 50 of the conventional single chip or expanded architecture type includes such conventional elements as a central processing unit CPU 56 for carrying out control, arithmetic and logic operations, input/output circuitry I/O 52 for controlling communication of input and output signals, random access memory devices RAM 58 for fast access temporary storage of data, and read only memory devices ROM 54 for permanent storage of data, program instructions, etc. The controller 50 receives the described signals BARO, Sel, Tt, RPMt, RPMe, MAF, TP, and MAP and through execution of a series of program instructions stored in ROM 54, samples said input signals and generates powertrain control and diagnostic commands which are issued to various actuators and indicators.

More specifically, an input air control command IAC is generated periodically and issued to bypass valve 26 as a current command for driving the valve to a desired opening position. Under idle operating conditions, which may be indicated by a closed intake air valve 16 and a stable, relatively low engine speed, IAC may be determined as a function of a difference between a desired and an actual engine speed (engine speed error). Under off-idle operating conditions, IAC may be determined as a function of an operator command. IAC may be referenced from a stored schedule of IAC commands as a single entry of the stored schedule that corresponds to current engine speed error or to the current operator command. The referenced IAC command may then be adjusted, if necessary, to provide for engine output torque control, such as in accord with the preferred embodiment of this invention.

An ignition timing command EST is also generated and output by controller 50 to a conventional ignition controller 60 which itself may be integrated into the controller 50 or may be a standalone controller dedicated to timing the issuance of drive signals to individual spark plugs (not shown) to allow for timed ignition of the air/fuel mixture delivered to the engine cylinders as is generally understood in the art. The signal EST may be referenced as a function of a minimum best torque MBT ignition timing schedule which provides for maximum engine output torque without engine knock. The referenced MBT ignition timing may then be adjusted in direction to vary engine output torque as needed to provide for a desired engine operation, including to provide for stable engine speed control under garage shift conditions in accord with the current embodiment of this invention.

The operations for carrying out powertrain control operations are, as described, stored in a step by step manner in ROM 54 and are executed selectively while the controller 50 is operating. Included in such operations are the operations of FIG. 3 which are executed following passage of each tooth or notch on the turbine 36 or on the transmission input shaft 38 by the sensor 42. For example, controller 50 receives signal RPMt in a standard input capture port of I/O unit 52. Such port (not shown) is set up to generate a controller interrupt each time the signal RPMt crosses a defined signal threshold, which provides, in this embodiment, an interrupt for each passage of a tooth or notch past the sensor 42. Upon occurrence of the interrupt, any current low priority controller operations are temporarily suspended to allow for execution of an interrupt service routine including the operations of FIG. 3 beginning at a step 200 and proceeding to store the current value of a controller free-running clock into a RAM location at a next step 202.

Figure 3:
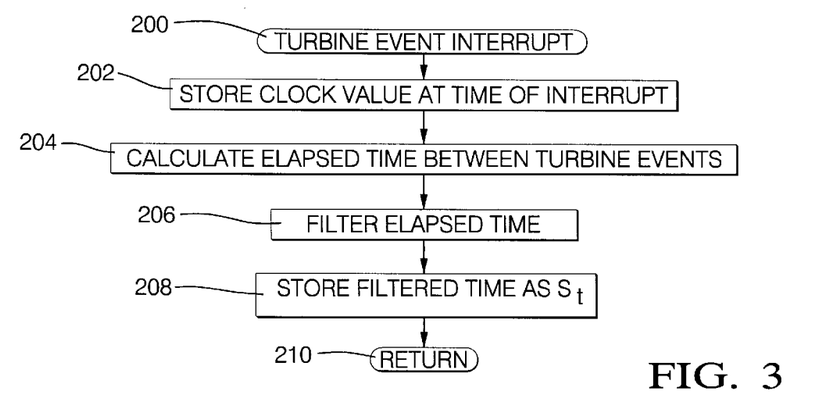
FIGS. 3–4 are computer flow diagrams illustrating a sequence of operations for controlling the powertrain through the powertrain control hardware of FIG. 2.
Figure 4A:
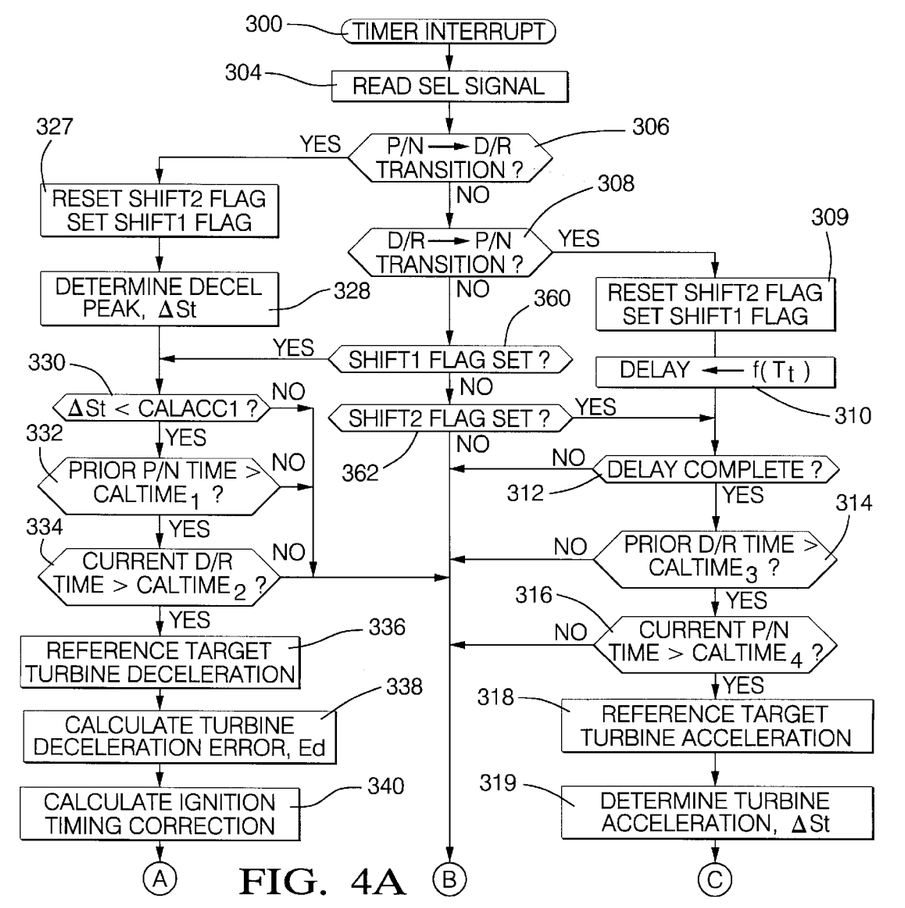
Figure 4B:
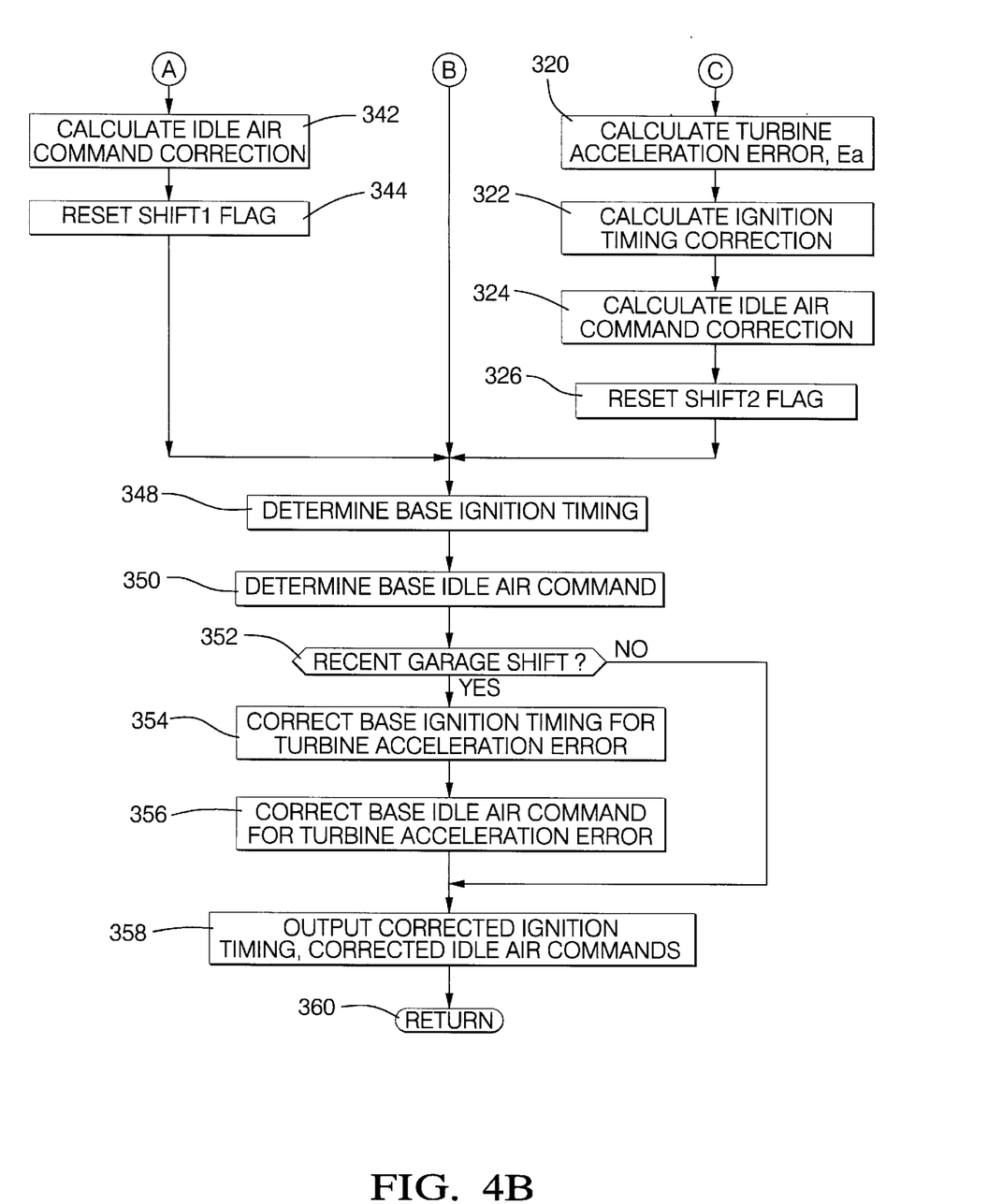

The elapsed time between turbine interrupts is next calculated at a step 204 as a difference between the clock value stored at the step 202 and a most recent prior stored clock value, from a most recent prior iteration of the operations of FIG. 3. The elapsed time is next filtered through an appropriate filter process, such as a Kalman filter process at a next step 206 and is stored in RAM at a next step 208 as a filtered time St which is directly proportional to turbine speed. St will be used as an indication of current turbine speed in the powertrain control operations of this embodiment, which are illustrated in FIG. 4. After storing St, the interrupt service operations of FIG. 3 are complete, and are concluded by returning, via a next step 210, to resume any interrupted controller operations.

The powertrain control operations of this embodiment are executed on a timed basis, for example, about every twelve milliseconds while the controller is operating and are of a lower priority than the operations of FIG. 3 such that they may be temporarily suspended to allow for execution of the operations of FIG. 3, as described. On about a twelve millisecond interval, or any suitable time interval for alternative embodiments of this invention, or indeed following certain powertrain control events in yet further alternative embodiments of this invention, powertrain control operations illustrated in FIG. 4 are executed including operations to control fueling, intake air rate and ignition timing of the powertrain of FIG. 1. For example, a standard time interrupt may be set up to occur about every twelve milliseconds while the controller 50 is operating based on the free running clock of controller 50, to interrupt and temporarily suspend relatively low priority controller operations to allow for execution of the interrupt service routine of FIG. 4.

Such operations begin at a step 300 and proceed to read the select signal Sel indicating the current gear of the transmission 20 of FIG. 2 at a step 304. The current active gear of the transmission as indicated by the current value of Sel is next compared to a most recent prior active transmission gear at a step 306 to determine if a shift from a park or neutral transmission gear (P/N) to a drive or reverse transmission gear (D/R) has occurred (a garage shift maneuver). If such a shift has occurred, compensation operations are carried out via steps 327–344. If no such shift has occurred, a determination is made at a next step 308 as to whether a garage shift maneuver from drive or reverse (D/R) to park or neutral (P/N) has occurred as indicated by the current and most recent prior sampled Sel values. If such a garage shift maneuver has occurred, compensation operations of steps 309–326 are next executed.

If no D/R to P/N shift is determined to have occurred at the step 308, a flag SHIFT1 stored in RAM 58 (FIG. 1) is next examined at a step 360. SHIFT1 is set while compensation operations are active following a P/N to D/R garage shift maneuver and is otherwise clear. If SHIFT1 is determined to be set at the step 360, the P/N to D/R compensation operations of steps 328–344 are next executed. If SHIFT1 is not set as determined at the step 360, a flag SHIFT2 stored in RAM 58 (FIG. 1) is next examined at a step 362. SHIFT2 is set while compensation operations are active following a D/R to P/N garage shift maneuver and is otherwise clear. If SHIFT2 is determined to be set at the step 362, the D/R to P/N garage shift compensation operations of steps 312–326 are next executed. If SHIFT2 is determined to not be set at the step 362, garage shift compensation is not currently required, and general control operations of steps 348–358 are next executed, to be described.

Returning to step 327, which is executed following a detected P/N to D/R shift, flag SHIFT1 is set and flag SHIFT2, if necessary, is cleared to indicate which garage shift compensation operations are active. Next, engine output torque control operations responsive to a turbine deceleration error are executed. Such operations begin with a determination, at a step 328, of peak turbine deceleration ΔSt as a maximum time rate of decrease in turbine speed over a predetermined time interval following the detected garage shift maneuver, for example through differentiation of a plurality of St samples over a predetermined time interval. ΔSt is next compared, at a step 330, to a calibrated turbine speed change limit value CALACC1, which may be stored in ROM 54 (FIG. 1) as a scalar value representing a calibrated minimum turbine speed change since the change in transmission state detected at the step 306 that indicates occurrence of a garage shift maneuver. For example, in this embodiment, CALACC1 is set to about −300 r.p.m. If ΔSt is less than CALACC1, then a garage shift maneuver corresponding to a significant load change is assumed to be beginning, and compensation therefor may be required. If ΔSt is determined to be greater than CALACC1, then no such compensation is, for the currently determined maximum speed change value ΔSt, assumed to be required, and the control operations of steps 348–358 are next executed.

Returning to step 330, if ΔSt is less than CALACC1, a stored time value representing the amount of time spent in park or neutral prior to the currently detected garage shift maneuver is compared to a time threshold CALTIME1 at a next step 332. CALTIME1 is determined through a conventional calibration procedure as the minimum amount of time in park or neutral before a valid garage shift maneuver can be assumed to be present, for example as opposed to a rapid transition through transmission gears not associated with a substantial load change applied to the engine. In this embodiment, CALTIME1 is set to about twenty-five milliseconds, and the time in P/N may be calculated and stored by the CPU 56 (FIG. 1) following the detected shift at the step 306.

If the stored time in P/N is greater than CALTIME1, as determined at the step 332, the time since the shift out of P/N is next compared to a calibrated time CALTIME2 at a step 334. The time since the shift out of P/N may be calculated by the CPU 56 (FIG. 1) as a difference between the current value of a free running clock of the controller 50 and the value of the clock at the time the shift was detected at the step 306. The calibrated time CALTIME2 may be determined through a conventional calibration procedure as the minimum time required to be in drive or reverse before a valid garage shift maneuver is assumed to be present, such as about twenty-five milliseconds in this embodiment. If the time since the shift out of P/N exceeds CALTIME2 at the step 334, a valid garage shift maneuver is present, and compensation therefor is next calculated at the steps 336–342. Alternatively, if any of the conditions of steps 330–334 are not met, a valid garage shift maneuver is assumed to not have occurred and no compensation is therefore assumed to be necessary, and the general control operations of steps 348–358 are next executed.

Returning to the garage shift compensation of steps 336–342, which operations generally determine a deceleration error term representing the deviation of turbine acceleration away from a desired deceleration rate characteristic of a garage shift maneuver with stable engine speed, and prescribe engine control command changes to quickly drive down the acceleration error toward zero error. More specifically, a target turbine deceleration value is first referenced as a function of powertrain operating conditions at a step 336. The target turbine deceleration is provided as a function of powertrain operating conditions and may be determined through a conventional calibration procedure as a desired rate of change in engine speed during a garage shift maneuver from a park or neutral transmission gear to a drive or reverse transmission gear.

The calibrated target turbine deceleration is set to a value corresponding to about 0.06 G deceleration in this embodiment and is stored in ROM 54 (FIG. 2). Alternatively, the target turbine deceleration may vary as a function of operating conditions, for example as a function of transmission coolant temperature, engine temperature, or engine speed, wherein a schedule of target turbine deceleration values may be determined through a conventional calibration procedure as a function of varying powertrain parameters and stored in the form of a schedule of deceleration values with a current target deceleration referenced from the schedule as a function of transduced current values of powertrain operating parameters.

After referencing a current target turbine deceleration value at the step 336, a turbine deceleration error Ed is calculated at a next step 338 as a simple difference between the target turbine deceleration and ΔSt. Ed represents a deviation away from a desired deceleration, and may be used to determine turbine "jerk" (time rate of change in turbine deceleration). Turbine jerk corresponds to a substantial torque load change condition which, if improperly compensated, may result in a substantial engine speed change during a garage shift maneuver. An ignition timing correction is then determined as a function of Ed at a next step 340. The timing correction is determined using calibration information stored in ROM 54 (FIG. 1) to provide an increase in engine output torque to offset, at least in part, the increase in torque load associated with application of the driven wheel and transmission load through to the engine, to minimize a corresponding engine speed decrease prior to occurrence of any significant engine speed decrease. The engine speed decrease that can occur for such a garage shift maneuver is illustrated by curve 122 of FIG. 1B. By generating an opposing engine output torque increase in response to the turbine speed decrease (illustrated by curve 102 of FIG. 1A), the increase in torque load may be compensated before it is translated across the torque converter 30 (FIG. 1) and to the engine to reduce engine speed. The required increase in engine output torque that is to be generated through spark timing variation is determined through a conventional calibration procedure as a function of Ed and of input signal Tt indicating transmission oil temperature.

The magnitude of the ignition timing correction is limited to a preset timing limit to avoid knock conditions or other undesirable engine cylinder combustion conditions, with engine intake air rate control applied as supplemental torque control to provide any additional engine output torque increase that cannot be provided through ignition timing correction. The overall torque increase provided through ignition timing and intake air control opposes the torque load increase caused by the garage shift maneuver detected at the step 306. Accordingly, after determining, such as through application of a current value of Tt and Ed to a standard lookup table of calibrated timing correction values stored in ROM 54 (FIG. 1), an ignition timing correction value at the step 340, an idle air command correction is determined at a next step 342 as a function of Ed and Tt, for example through application of Ed and Tt to a stored lookup table of standard form in ROM 54 (FIG. 1). The lookup table includes calibrated intake air rate correction values that, coordinated with the ignition timing values of the table referenced at the described step 340, lead to increase in overall engine output torque that will offset the torque load increase caused by the garage shift maneuver, driving deceleration error toward zero, contributing to a desirable steady engine speed throughout the garage shift maneuver, as described. The idle air command correction values of the stored lookup table are determined as the change in engine intake air rate (which will, as is generally understood in the art, lead to an increase in engine fueling rate causing an increase in engine output torque) that will provide a precise increase in engine output torque in opposition to an engine torque load increase caused by the garage shift maneuver to maintain a steady engine speed during the garage shift maneuver from P/N to D/R, as described.

After determining the coordinated correction in ignition timing and intake air rate increase at the respective steps 340 and 342, the SHIFT1 flag may be reset at the step 344 to indicate that compensation has been determined for the garage shift maneuver. Alternatively, the SHIFT1 flag may, in a further embodiment of this invention, remain set by bypassing the step 344, to allow for periodic updating of the ignition timing and airflow corrections throughout the garage shift maneuver in accord with the principles of this invention. After resetting the SHIFT1 flag at the step 344, or, after the step 342 in the described alternative embodiment of this invention, the general control operations of steps 348–358 are carried out, as will be described.

Returning to the operations to compensate a drive/reverse to park/neutral garage shift maneuver following a determination that such a maneuver has occurred at the described step 308, the compensation operations are initiated beginning with a step 309 in which flag SHIFT1 is reset to zero (if necessary) and flag SHIFT2 is set to indicate the active garage shift compensation operations. Next, a delay value is referenced from ROM 54 (FIG. 1) as a function of transmission fluid (oil) temperature as indicated by signal Tt of FIG. 1. The delay value represents the time following detection of a garage shift maneuver at the step 308 after which compensation for the shift maneuver should be applied. The time delay should be determined through a conventional calibration process as a function of transmission fluid temperature as the time following a change in state of signal Sel (FIG. 2) required before the torque load change is translated from the transmission 20 to the engine 10. The delay is inversely proportional to transmission fluid temperature, and is stored in the form of a schedule or table as a function of various values of Tt.

After referencing the delay value of the stored schedule or table corresponding to the current transmission fluid temperature as indicated by signal Tt, or if the SHIFT2 flag is determined to be set at the described step 362, a determination is made at a next step 312 as to whether the current delay period has elapsed (is complete). The delay is complete if the difference between the current time (indicated, for example, by the current value of a conventional free-running controller clock) and the time that the shift was detected at the step 308 exceeds the current delay value. If the delay is determined to be complete at the step 312, steps 314 and 316 are next executed to determine if a genuine garage shift maneuver has occurred. Specifically, a stored time value representing the amount of time spent in drive or reverse prior to the currently detected garage shift maneuver is compared to a time threshold CALTIME3 at a next step 314. CALTIME3 is determined through a conventional calibration procedure as the minimum amount of time in drive or reverse before a valid garage shift maneuver can be assumed to be present, for example as opposed to a rapid transition through transmission gears not associated with a substantial load change applied to the engine. In this embodiment, CALTIME3 is set to about twenty-five milliseconds, and the time in drive or reverse may be calculated and stored by the CPU 56 (FIG. 1) following the detected shift at the step 308.

If the stored time in drive or reverse is greater than CALTIME3 as determined at the step 314, the time since the shift out of drive or reverse is next compared to a calibrated time CALTIME4 at a step 316. The time since the shift out of drive or reverse may be calculated by the CPU 56 (FIG. 1) as a difference between the current value of a free running clock of the controller 50 and the value of the clock at the time the shift was detected at the step 308. The calibrated time CALTIME4 may be determined through a conventional calibration procedure as the minimum time required to be in park or neutral before a valid garage shift maneuver is assumed to be present, such as about twenty-five milliseconds in this embodiment. If the time since the shift out of drive or reverse exceeds CALTIME4 at the step 316, a valid garage shift maneuver is present, and compensation therefor is next calculated at the steps 318–324. Alternatively, if the current delay period is determined to not yet have elapsed at the step 312, or if the conditions of steps 314 and 316 are determined to not be met, general engine control operations are next carried out via steps 348–358, to be described.

Returning to the garage shift compensation of steps 318–324, these operations generally provide for generation of an error term representing a deviation in turbine acceleration away from a target acceleration characteristic of a garage shift maneuver with stable engine speed, and prescribe change to engine parameter control commands to quickly drive the error term toward zero. More specifically, a target turbine acceleration value is first referenced as a function of powertrain operating conditions at a step 318. The target turbine acceleration is provided as a function of powertrain operating conditions and may be determined through a conventional calibration procedure as a desired rate of change in engine speed during a garage shift maneuver from a drive or reverse transmission gear to a park or neutral transmission gear. The calibrated target turbine acceleration is set to a value corresponding to about 0.06 G in this embodiment and is stored in ROM 54 (FIG. 2). Alternatively, the target turbine acceleration may vary as a function of operating conditions, for example as a function of transmission coolant temperature, engine temperature, or engine speed, wherein a schedule of target turbine acceleration values may be determined through a conventional calibration procedure under varying powertrain parameters and stored in the form of a schedule of acceleration values with a current target acceleration referenced from the schedule as a function of current values of powertrain operating parameters.

After referencing a current target turbine acceleration value at the step 318, actual turbine acceleration ΔSt is determined at a next step 319 as the increase in turbine speed from the time of the detection of a garage shift maneuver at the step 308 to the present time. Turbine speed is indicated through standard processing of signal RPMt, as described. Turbine acceleration error Ea is next calculated at a step 320 as a simple difference between the target turbine acceleration and ΔSt. Ea represents a deviation away from a desired acceleration, and may be used to determine turbine "jerk" (time rate of change in turbine acceleration). Turbine jerk corresponds to a substantial torque load change condition which, if improperly compensated, may result in a substantial engine speed change during a garage shift maneuver. An ignition timing correction is then determined as a function of Ea at a next step 322. The timing correction is determined using calibration information stored in ROM 54 (FIG. 1) to provide a decrease in engine output torque to offset, at least in part, the decrease in torque load associated with removal of the driven wheel and transmission load through to the engine, to minimize a corresponding engine speed increase, prior to occurrence of any significant engine speed increase. The engine speed increase that can occur for such a garage shift maneuver is illustrated by curve 124 of FIG. 1B. By generating an opposing engine output torque decrease in response to the turbine speed increase (illustrated by curve 104 of FIG. 1A), the decrease in torque load may be compensated before it is translated across the torque converter 30 (FIG. 1) and to the engine to increase engine speed.

The required decrease in engine output torque that is to be generated through spark timing variation is determined through a conventional calibration procedure as a function of Ed and of input signal Tt indicating transmission coolant temperature. The magnitude of the ignition timing correction is limited to a preset timing limit to avoid knock conditions or other undesirable combustion conditions, with engine intake air rate control applied as supplemental torque control to provide any additional engine output torque decrease that cannot be provided through ignition timing correction. The overall torque decrease provided through ignition timing control and intake air rate control opposes the torque load decrease caused by the garage shift maneuver detected at the step 308. Accordingly, the current value of Tt and Ed are applied to a standard lookup table of calibrated timing correction values stored in ROM 54 (FIG. 1) to generate an ignition timing correction value at the step 322.

An idle air command correction is next determined at a next step 324 as a function of Ed and Tt, for example through application of Ed and Tt to a stored lookup table of standard form in ROM 54 (FIG. 1). The lookup table includes calibrated intake air rate correction values that, coordinated with the ignition timing values of the table referenced at the described step 340, lead to decrease in overall engine output torque that will offset the torque load decrease caused by the garage shift maneuver driving acceleration error toward zero, contributing to a desirable steady engine speed throughout the garage shift maneuver, as described. The idle air command correction values of the stored lookup table are determined as the change in engine intake air rate (which will, as is generally understood in the art, lead to a decrease in engine fueling rate causing a decrease in engine output torque) that will provide a precise decrease in engine output torque in opposition to an engine torque load decrease caused by the garage shift maneuver to maintain a steady engine speed during the garage shift maneuver from drive or reverse to park or neutral, as described.

After determining the coordinated correction in ignition timing and intake air rate at the respective steps 322 and 324, the SHIFT2 flag may be reset at the step 326 to indicate that compensation has been determined for the current garage shift maneuver. Alternatively, the SHIFT2 flag may, in a further embodiment of this invention, remain set by bypassing the step 326, to allow for periodic updating of the ignition timing and airflow corrections throughout the garage shift maneuver in accord with the principles of this invention. After resetting the SHIFT2 flag at the step 326, or, after the step 324 in the described alternative embodiment of this invention, the general control operations of steps 348–358 are carried out to provide for such control operations as determination of a current ignition timing command at which a drive signal is applied to a spark plug for a next active engine cylinder to ignite an air/fuel mixture in the cylinder, and determination of a current intake air rate into the engine. Additional operations, such as fuel control operations responsive to the engine intake air rate, transmission shift control operations, and diagnostic operations are typical of further operations that may be carried out in such control loop, or on a distinct time basis or an event basis while the controller 50 of FIG. 1 is operating.

More specifically, the general control operations first determine a base ignition timing command at a step 348 as a function of the generally known ignition timing for minimum best torque (MBT timing). A base idle air command is next determined at a step 350 as a function of an operator manual input, such as may take the conventional form of a transduced degree of depression of an accelerator pedal (not shown), or as a function of an engine speed error. A determination is next made at a step 352 of whether garage shift compensation is active, such as due to a recent detected garage shift maneuver. For example, if a garage shift maneuver was recently (in the last 12.5 milliseconds) detected, garage shift compensation may be required and the operations proceed to correct the determined base ignition timing value by applying the timing correction value determined for the current garage shift maneuver thereto, such as through an additive timing operation.

If the recent garage shift maneuver is a P/N to D/R maneuver, the timing correction determined at the step 340 is applied to the base ignition timing, and if the recent garage shift maneuver is a D/R to P/N maneuver, the timing correction determined at the step 322 is applied to the base ignition timing. After correcting the base ignition timing, the base idle air command is next corrected at a step 356 by applying, for example in an additive arithmetic operation, the idle air correction factor to the base idle air command. For a P/N to D/R garage shift maneuver, the idle air correction determined at the step 342 is applied to the base idle air command, and for a D/R to P/N garage shift maneuver, the idle air correction determined at the step 324 is applied to the base idle air command. Next, or following a determination at the step 352 that no recent garage shift maneuver has occurred, the ignition timing command, whether corrected or not, and the idle air command, whether corrected or not, are output at a step 358. The ignition timing command is output as timing command EST to the ignition controller 60 of FIG. 2, and is applied by controller 60 to a next active spark plug at a timing dictated by the command EST, as is generally understood in the art. The idle air control command is output to the idle air control valve V 26 of FIG. 2 in the form of a drive current signal IAC to drive the valve V to a corresponding valve opening position, as is generally understood in the art. Next, the operations for servicing the timer interrupt of FIG. 4 are concluded by returning, via a next step 360, to any controller operations that may have been temporarily suspended to allow for execution of the operations of FIG. 4, such as standard maintenance or diagnostic operations.

The preferred embodiment is not intended to limit or restrict the invention since many modifications may be made through the exercise of ordinary skill in the art without departing from the scope of the invention.

The embodiments of the invention in which a property or privilege is claimed are described as follows.

What is claimed is:

1. A method for controlling speed of an engine coupled, via a hydrodynamic converter, to an automatic transmission, the hydrodynamic converter having a pump rotating with an engine output shaft and a turbine rotating with a transmission input shaft, the transmission having driven and undriven states, the method comprising the steps of:

sensing a request for transition between driven and undriven transmission states;

determining actual change in turbine speed upon sensing the request;

providing a target turbine speed change value;

calculating an acceleration error representing a difference between the target turbine speed change and the actual turbine speed change;

generating an engine output torque change as a function of the acceleration error to minimize the error; and varying engine output torque in accordance with the generated engine output torque change to control engine speed during the transition between driven and undriven transmission states.

2. The method of claim 1, further comprising the step of:

referencing a base engine control command representing a base engine output torque;

and wherein the generating step generates an engine control command as a predetermined function of the acceleration error and of the base engine control command;

and wherein the varying step varies engine output torque by controlling an engine control parameter in accordance with the generated engine control command.

3. The method of claim 2, wherein an air/fuel mixture is ignited in cylinders of the engine at a timing controlled in accordance with an ignition timing command to vary engine output torque, and wherein the engine control command is the ignition timing command.

4. The method of claim 2, wherein a flow rate of engine intake air is controlled through variation of an intake air valve position command to control a restriction position of an intake air valve to vary engine output torque, and wherein the engine control command is the intake air valve position command.

5. The method of claim 1, further comprising the steps of:

storing a schedule of target turbine speed change values as a function of powertrain operating conditions;

sampling input signals indicating a current powertrain operating condition; and referencing the target turbine speed change from the stored schedule as the target turbine speed change corresponding to the current powertrain operating condition.

6. The method of claim 5, wherein fluid is circulated throughout the transmission and wherein the sampled input signals include a input signal indicating transmission fluid temperature.

7. In a control system for an automotive powertrain including an engine having an output shaft, a transmission having an input shaft, and a fluidic torque converter for coupling the engine to the transmission, the torque converter having a pump mechanically linked to the engine output shaft and a turbine mechanically linked to the transmission input shaft and fluidically linked to the pump, a method for varying engine output torque during a garage shift maneuver between undriven and driven transmission states to reject engine torque load changes so as to maintain a substantially constant engine speed throughout the garage shift maneuver, comprising the steps of:

detecting initiation of a garage shift maneuver between undriven and driven transmission states;

sampling, during the garage shift maneuver, a turbine speed signal indicating rate of rotation of the turbine;

calculating change in turbine speed during the garage shift maneuver;

calculating turbine acceleration error as a difference between the calculated turbine speed change and a target turbine speed change;

determining an engine output torque change as a function of the calculated turbine acceleration error; and varying engine output torque during the garage shift maneuver in accordance with the determined engine output torque change.

8. The method of claim 7, wherein the driven transmission states include drive gear states and at least one reverse gear state, and wherein the undriven transmission states include a park state and a neutral state.

9. The method of claim 7, further comprising the steps of:

sampling input signals indicating a current operating condition; and establishing the target turbine speed change as a predetermined function of the current operating condition.

10. The method of claim 9, the transmission having a fluid circulation path through which transmission fluid is circulated and having a temperature transducer disposed in the circulation path for transducing transmission fluid temperature into a temperature signal, and wherein the sampled input signals include the temperature signal.

11. The method of claims 7, the engine including an actuator responsive to an engine parameter control command to control an engine parameter, wherein the varying step further comprises the steps of:

generating an engine parameter control command modification as the control command modification required to vary the engine parameter so as to effect a change in engine output torque in accordance with the generated engine output torque change;

referencing a base engine parameter control command;

modifying the base engine parameter control command in accordance with the engine parameter control command modification; and controlling the actuator by applying the modified base engine parameter control command to the actuator to vary the engine parameter so as to provide for the generated engine output torque change.

12. The method of claim 11, wherein the engine parameter is a predetermined one of engine intake air rate, engine inlet fuel rate, and engine ignition timing.

\* \* \* \* \*